Aug. 15, 1961    J. ROSENBERG    2,996,348
AUTOMATIC TRACER-PLAYBACK SYSTEM FOR MACHINE TOOLS
Filed Feb. 17, 1959    3 Sheets-Sheet 1

INVENTOR.
JACK ROSENBERG
BY
Lyon & Lyon
ATTORNEYS

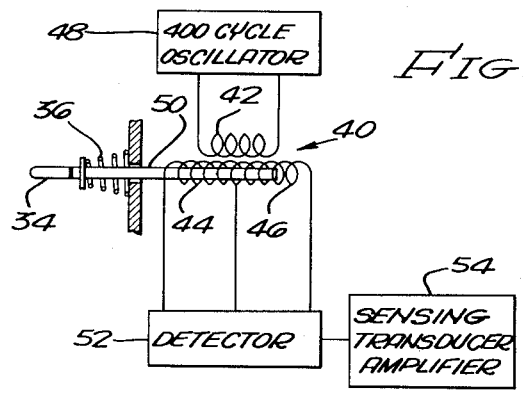
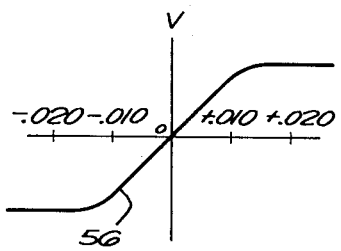
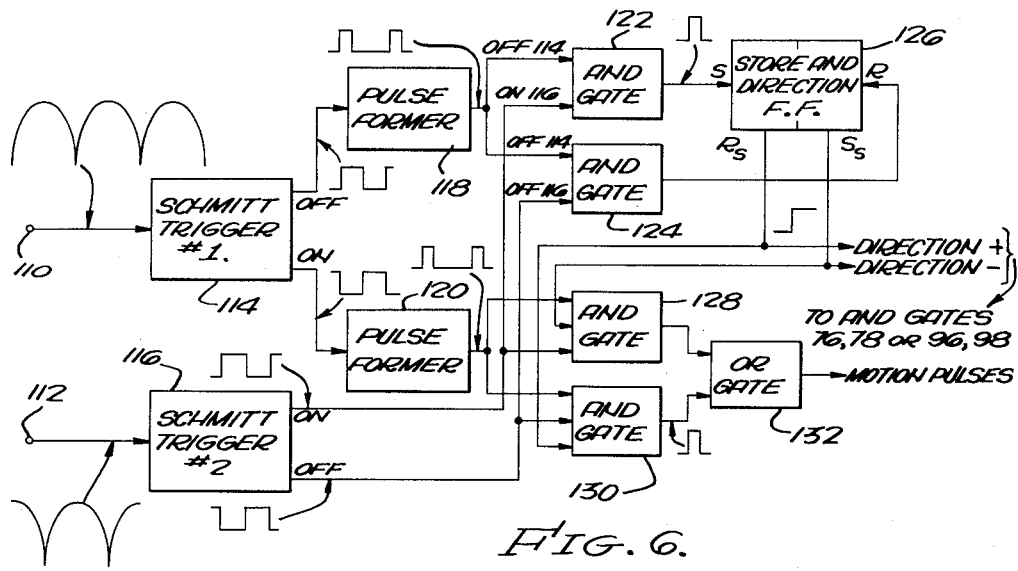
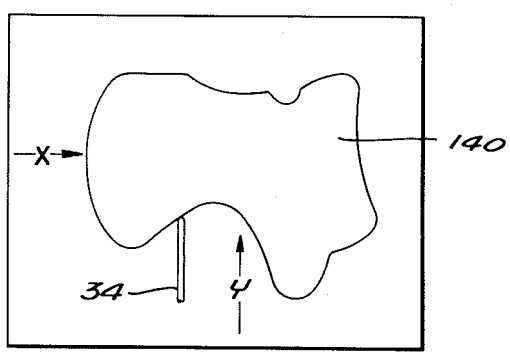
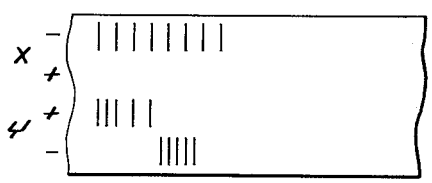
INVENTOR.
JACK ROSENBERG

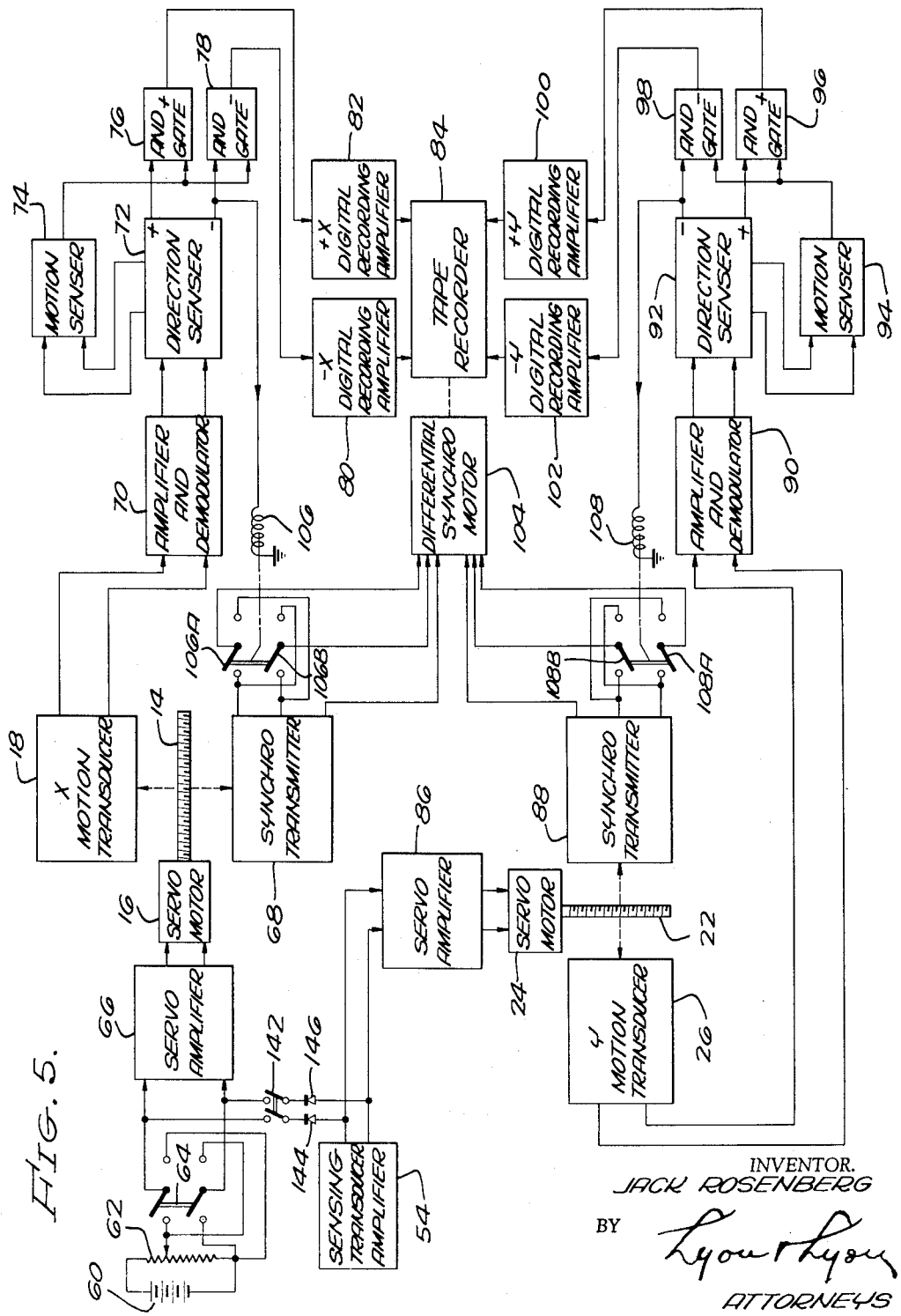

United States Patent Office 2,996,348
Patented Aug. 15, 1961

1

2,996,348
AUTOMATIC TRACER-PLAYBACK SYSTEM
FOR MACHINE TOOLS
Jack Rosenberg, Pacific Palisades, Calif., assignor to General Dynamics Corporation, Rochester, N.Y., a corporation of Delaware
Filed Feb. 17, 1959, Ser. No. 793,769
4 Claims. (Cl. 346—33)

This invention relates to electrical control systems for automatically controlling the operation of a machine tool and more particularly to improvements for obtaining an automatic tracer and playback operation.

In a Patent No. 2,833,941 to J. Rosenberg et al. for an "Automation System," which was issued on May 6, 1958, there is described an arrangement for recording motion control signals by employing a computing system into which there is entered data comprising the coordinates of the motion path which it is desired that the cutting tool of a machine tool follow. The computer operates on this input data and provides as an output pulse signals on a recording medium. These pulse signals, also known as motion control signals, are a digital representation of the desired motion path. After the recording is completed it may be transferred to a playback device which reads the signals from the recording medium and enters them into a servo loop system. This comprises apparatus for converting these signals into signals which control servomotors which drive a machine tool table upon which a work piece is mounted. The table is simultaneously moved along several coordinate axes in response to these direction control signals in a manner so that the path followed by the cutting tool relative to the work piece is the desired path.

It oftentime happens that instead of first making a drawing of a part, a model having the desired shape and size may already exist. It certainly would be more economical if instead of having to thereafter make drawings of this model from which data for the computer is derived, some means could be provided for deriving motion control signals directly from the model which signals can be recorded for operating the aforementioned servo loop system. This would save not only the time for making drawings, but also the time required for programing the data therefrom for the computer. Furthermore, with such a record drawings may not be necessary and also in locations where the model is always made first, the computer need not be purchased. In many instances where a model is available, drawings are missing and a tedious and expensive gauging operation would have to be performed on the model to obtain information for making a new drawing. Furthermore, there are often cases where a full-scale model of a new part is derived by a purely empirical process of trial and error, to satisfy mainly esthetic needs. The automotive and household appliance industries employ this practice.

Accordingly, an object of this invention is the provision of a novel automatic tracer playback system.

Another object of the present invention is the provision of an automatic playback system which can automatically provide a recording of motion control signals for a desired path.

Yet, another object of the present invention is the provision of an inexpensive automatic tracer playback system.

These and other objects of the present invention may be achieved in an arrangement whereby a finished work piece or model is mounted on a machine tool table and a sensing transducer is positioned in juxtaposition thereto. Means are provided for moving the work piece and sensing transducer relative to one another so that the sensing transducer controls the motion of the table in a manner to maintain the sensing transducer continuously in contact with the model. Motion transducers are driven from the table to provide outputs indicative of increments of motion along the respective coordinate axes that the work piece moves. These motion transducer signals, for the respective axes, are sensed to derive the direction of motion, as well as whether or not motion occurs. Further means is provided for each axis for recording signals, representative of the increments of motion which have occurred, in a specifically provided track on a recording medium for the direction of motion which has been sensed.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 3 is a circuit diagram illustrating a type of sensing transducer suitable for use in the embodiment of the invention.

FIGURE 4 is a characteristic curve for a sensing transducer of the type shown in FIGURE 3.

FIGURE 5 is a block diagram of an embodiment of the invention.

FIGURE 6 is a block diagram of motion and direction sensing circuits suitable for use in the embodiment of the invention.

FIGURE 7 is a view in elevation of a work piece and sensing probe shown to assist in an explanation of this invention.

FIGURE 8 is a representation of the type of recording obtained from the embodiment of the invention.

In order to facilitate an understanding of this invention the explanation will be directed to the employment of an automatic machine tool such as a milling machine for effectuating automatic tracer playback control. This should not be construed as a limitation upon the invention since the principles explained here can readily be extended to other types of machine tools for achieving the desired result.

Figure 1:
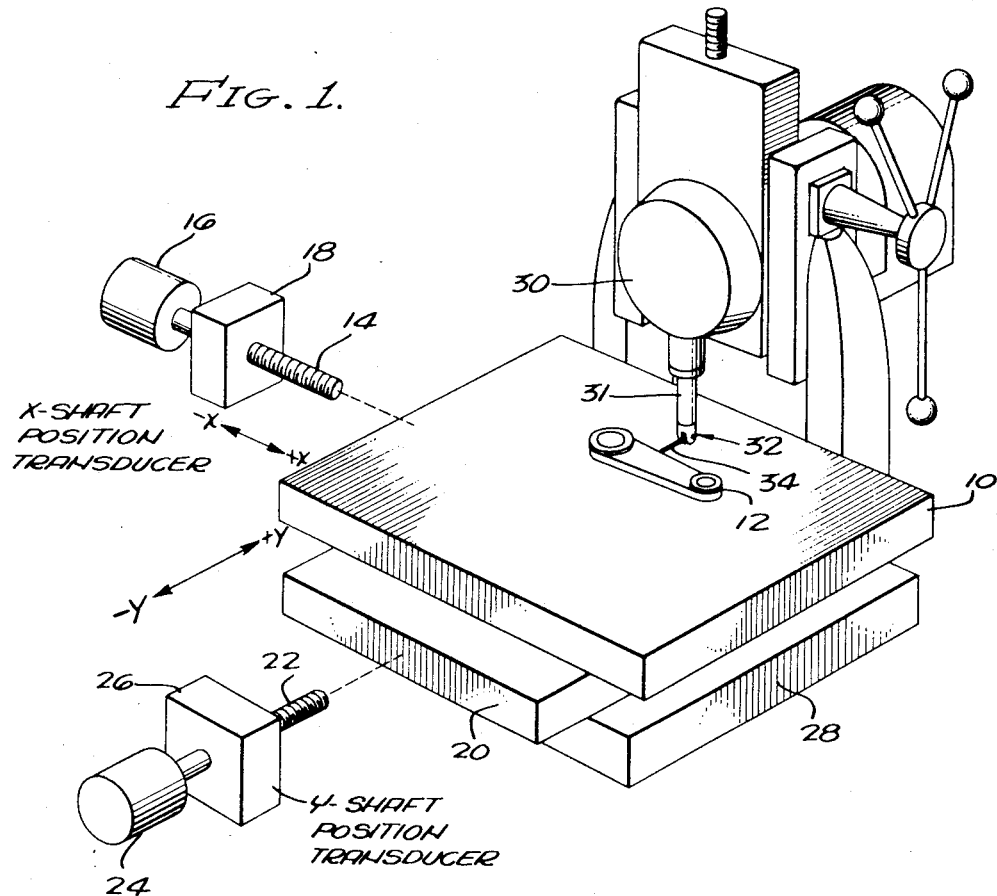
FIGURE 1 is a drawing of an automatic machine tool of the type suitable for use in the invention.

FIGURE 1 is a view of a portion of an automatic milling machine which is shown to assist in an understanding of the invention. This will include a table 10 upon which a model 12 having the desired shape is mounted. A lead screw 14 can move the table forward or backward along the X axis when driven by a servomotor 16. A motion transducer 18 is mounted upon the lead screw or in association therewith to be driven thereby to indicate increments of motion which are made by the table as it moves along the X axis.

Figure 2:
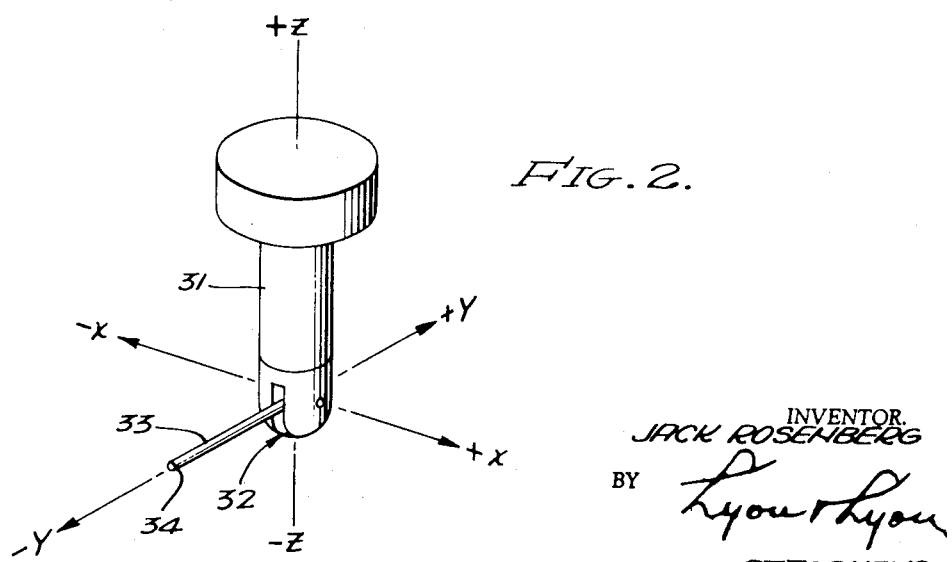
FIGURE 2 is an isometric view of a suitable type of sensing transducer for use in the invention.

The table 10 rides over a saddle 20, which itself can be moved backwards and forwards along a Y axis. The saddle 20 is driven by a lead screw 22 which in turn is driven from a servomotor 24. Driven from the lead screw is a Y axis motion transducer 26, which produces an output indicative of increments of motion of the table along the Y axis. The saddle 20 is supported on the base 28 along which it slides. Not shown, for maintaining clarity in the drawings, is a similar arrangement for moving the table vertically along a Z axis. A turret head 30 is supported above the table 10 and it normally is used for holding and driving a cutting tool. Instead of carrying a cutting tool however, the turret in accordance with this invention, will carry a sensing transducer 32 which has a feeler probe 34, which can be oriented in any one of five directions. As shown in FIGURE 2, these five directions are identified as —X, +X, —Y, +Y, and —Z. In this manner the probe may be given the proper orientation for sensing the contours of a work piece when the work piece and probe are brought in contact from any one of five directions. If desired, a multiple spindle may be installed carrying a plurality of probes each one of which is oriented in a different direction and each one of which can be moved into position for sensing a particular side of a sample work piece. Alternatively, a compound probe, whose tip can be displaced in any of six orthogonal directions (+X, —X, +Y, —Y, +Z, —Z) and provides displacement to each of three linear transducers simultaneously, could be used.

Referring to FIGURE 3, there may be seen a diagram illustrating one type of well known sensing transducer which is suitable for utilization herein. This includes a differential transformer 40, having a primary winding 42 and two secondary windings 44, 46. The primary winding 42 is excited from a 400 cycle oscillator 48. The secondary windings 44, 46 are differentially wound so that either in the absence of a movable core 50 or when the core is inserted equally in these windings, the amplitudes of the voltages induced in the secondary windings will be opposite and equal, and a detector 52 will provide zero output voltage to a sensing transducer amplifier 54.

The core is biased by a spring 36 which is attached to a side of the housing of the device to cause the probe to extend, whereby the core, when the transducer is not in contact with an object, is unequally inserted in the two secondary windings. Thus, in the absence of anything pushing the probe end, there will be a voltage output having one polarity which is applied to the sensing transducer amplifier indicative of the fact that an unbalance exists. When the probe end is pushed to insert the core further into the secondary windings, the amplitude of this detected voltage decreases. Such decrease can continue with further movement of the probe until it attains a zero or null point. Further motion of the probe into the differential secondary windings causes a reversal in polarity of the output voltage applied to the sensing transducer amplifier, which continues to increase in an opposite polarity direction with further core insertion.

Referring now to FIGURE 4, there is shown a characteristic curve for the type of sensing transducer shown in FIGURE 3. This curve 56 illustrates the variation in the output voltage with insertion of the core 50 which is obtained from the sensing transducer amplifier. It will be seen that this voltage is a maximum and begins to diminish towards a zero value as the core is inserted, so as to be more and more evenly positioned relative to the secondary windings of the transformer. After passing through the zero or no voltage point, as the probe continues to be moved, the output voltage begins to increase in the opposite direction. The amount of movement of the probe is plotted as the horizontal coordinate of the graph shown in FIGURE 4.

Reference is now made to FIGURE 5 which is a block diagram of an embodiment of the invention. Some of the components shown in FIGURE 5 are identical to those shown in FIGURE 1 and accordingly these will bear the same reference numerals as are used in FIGURE 1. A constant source of potential represented as a battery 60, has a potentiometer 62 connected thereacross. The output of the potentiometer is connected to a reversing switch 64 which is connected in well known fashion for providing, when switched, voltages of opposite polarity. The output of the reversing switch 64 is applied to a servo amplifier 66. This amplifies the input until it is sufficient to drive a servomotor 16. The servomotor in turn drives the X lead screw 14. As shown in FIGURE 1, the X lead screw drives the table (not shown here) and also drives an X motion transducer 18 as well as a synchro transmitter 68. The synchro motion transmitter is a well known type of electromechanical device which provides output signals in response to increments of motion to its input. Here the lead screw can drive the synchro transmitter from a gear box, not shown, if desired. Obviously, lead screw increments of motion cause increments of motion of the table being driven thereby. The synchro transmitters are commercially available items. Motion transducers are commercially available items also and are purchasable from, for example, Telecomputing Corporation of North Hollywood, California, or the Farrand Control, Inc., of New York, New York.

The output of the motion transducer 18 is applied to an amplifier and demodulator 70 which removes any carrier signals from the motion transducer output and amplifies the signals representative of increments of motion. The output of the amplifier and demodulator is applied to direction sensor circuit 72, the function of which is to apply an output signal to one or the other of two output lines depending upon whether the motion being sensed is motion in a positive direction along the X coordinate or in a negative direction along the X coordinate. In addition to sensing direction, it is also necessary to sense whether or not motion has occurred. This is performed by a motion sensor circuit 74 which derives its information from the direction sensor 72. When motion occurs there is an output from the motion sensor circuit and if motion does not occur there is no output therefrom. A block diagram of a suitable direction and motion senser circuit is shown in FIGURE 6.

The output of the direction senser is applied to And gates respectively 76, 78. And gate 76 may be considered as the plus And gate since it provides an output when there is positive motion or motion along coordinate axis in a positive direction. And gate 78 is the minus And gate and it provides an output whenever there is negative motion or motion in a negative direction. The motion senser output will consist of a single pulse for each increment of motion. The direction senser output will consist of an enabling signal to one or the other of the two And gates 76, 78 in accordance with the direction which the table is moving. The respective And gate outputs are respectively applied to two X digital recording amplifiers 80, 82. These respective amplifiers are employed to record over two different tracks of a channel on tape (see FIGURE 8). The channel is provided for recording X motion control signals and will have two separate tracks therein for the purpose of respectively recording positive or negative motion from the amplifiers 82 or 80. These amplifiers 80, 82 feed a tape recorder 84. The tape recorder includes any other required amplifiers and tape recording heads, as well as the tape transport mechanism.

The sensing transducer amplifier 54 has its output connected to a servo amplifier 86, which is employed in the Y axis drive portion of the system. The servo amplifier 86 output drives the servomotor 24 which rotates the Y lead screw 22. A Y motion transducer 26 is coupled to the lead screw 22 to be driven thereby. Also driven by the lead screw 22 is a synchro transmitter 88.

The output of the Y motion transducer 26 consisting of electrical signals is applied to an amplifier and demodulator 90 which serves the purpose of removing any carrier and amplifying the motion representative signals of the Y motion transducer. These are applied to a direction senser 92 and to a motion senser 94. The direction senser 92, in the same manner as the direction senser 72 for the X axis, applies its output to enable one or the other of two And gates 96, 98. The output of the motion senser 94 is applied to both of these And gates. And gate 96 is enabled in the presence of positive motion along the Y axis, and And gate 98 is enabled in the presence of negative motion along the Y axis. The two And gates 96, 98 respectively apply their outputs to two Y digital recording amplifiers 100, 102. The tape (not shown) which is in the tape recorder will have a channel for recording Y axis motion and in that channel one track will be provided for recording positive motion control pulses which are provided at the output of the amplifier 100 and the other track is allocated for recording negative motion control pulses which are provided by the output of the amplifier 102.

The tape recorder 84 has its tape transport mechanism mechanically driven from the output of a differential synchromotor 104. The differential synchromotor 104 provides an output which is proportional to the sum of the outputs of the synchro transmitters 68 and 88. Thus, since the synchro transmitters are driven by the respective X and Y lead screws the speed of the motion of the tape upon which a recording is made is a function of the peripheral speed of the table around the profile of the model. This maintains approximately uniform recording density on the tape.

Since it is necessary that the tape recorder move the tape in only one direction during the recording process each synchro transmitter is provided with means for reversing the synchro transmitter output to the differential synchromotor whenever a reversal in direction occurs. Such means comprises for the X synchro transmitter a relay having a solenoid 106 which is excited whenever the direction senser provides an output indicative of the fact that motion is occurring in a negative direction along the X axis. The solenoid 106 can actuate its double pole double throw contacts 106a, 106b, when excited, to reverse the connections from the synchro transmitters to the synchromotor. It is only necessary to reverse two of the three leads from a synchro transmitter connected to a synchromotor to effectuate reversal of the relative operation.

The synchro transmitter 88 is also connected to the differential synchromotor through a relay having a solenoid 108 and a pair of double pole double throw contacts 108a, 108b. In the normally closed position with solenoid 108 not operated, as shown, two of the three leads of the synchro transmitter 88 are directly connected to the differential synchromotor 104. When solenoid 108 is operated by the output of the direction senser indicative of negative motion along the Y axis the double throw double pole contacts 108a, 108b are operated to reverse the connections between the synchro transmitter 88 and the differential synchromotor 104. As a result of the described operation of the relays 106 and 108, the synchro transmitter signals are always applied to the differential synchromotor with a polarity to maintain its rotation in one direction, regardless of the direction of operation of either of the lead screws.

Both synchro transmitters and the differential synchromotors of the type represented by rectangles in FIGURE 5 are well known elements and are commercially available from numerous manufacturers. The motion transducers 18 and 26 and their amplifier and demodulators 70, 90 represented by rectangles in FIGURE 5 are purchasable as a package from the manufacturers.

Although motion sensers and direction sensers are known, see the patent mentioned previously to Rosenberg et al., 2,833,941, and Patent 2,867,724 to Norman L. Olson, a preferred arrangement for a motion and direction senser is shown in block diagram form in FIGURE 6. This circuit is extracted from FIGURE 2 of the previously mentioned patent to Olson. Each motion transducer signal generator of the type previously mentioned produces as its output two trains of signals which are respectively applied to the terminals 110, 112 of the direction senser. These motion transducer signals are represented by the two full wave rectified signals which are in quadrature relationship with each other. A first Schmitt trigger circuit 114 is connected to the input terminal 110; a second Schmitt trigger circuit 116 is connected to the input terminal 112.

The Schmitt trigger circuit is a well known type of trigger circuit which is described in an article by O. H. Schmitt, which is entitled "A Thermionic Trigger Circuit," and is found described in the Journal of Scientific Instruments, volume 15, pages 24 through 26 of January 1938. This trigger circuit has only two output states, one of which it assumes as long as there is an input applied thereto which exceeds a certain predetermined level. It returns to the other state when its input drops below this predetermined level. The amplitude of the input signal required may be determined or controlled by judicious selection of the bias and values of the circuit components employed with the two tubes in constructing the trigger circuit. An output is derived from the trigger circuit as long as a pulse is applied to its input. Such output, which is derived as long as a pulse exceeding a predetermined amplitude is applied to its input, is designated as a first or "on" output. The other output derived from the trigger circuit, when the input pulse having the required amplitude is no longer present, is designated as a second or "off" output. The two outputs of Schmitt trigger circuits 114 and 116 are accordingly labeled as the "off" and "on" outputs in FIGURE 6. The sensing of motion and direction occurs within a motion increment, but not at the same point within a cycle for both directions of motion, but rather displaced 180 degrees or one-half cycle. The pattern presented by the Schmitt trigger circuit outputs over one cycle for motion in one direction differs from the output pattern for motion in the other direction. The logical circuitry provided senses this difference and provides an output accordingly.

Schmitt trigger circuit 114 applies its "off" output to a pulse forming network 118. Its "on" output is applied to a pulse forming network 120. These pulse forming networks are circuits which are employed for the purpose of producing a better defined output than the one received from the Schmitt trigger circuit. These pulse forming networks may be a passive type of network consisting of resistors and condensers, or preferably they may be the active type which includes tubes in a circuit, such as a one shot multivibrator, which, in response to its input is driven to an unstable state for a time determined by its circuit constants and then returned to its stable state. Output is derived while it is in its unstable state.

The output of the pulse forming network 118 is applied to two And gates 122, 124. These And gates, as well as those shown in FIGURE 5 of the drawings, are well known types of coincidence gates which require that all their inputs be simultaneously present before an output can be derived therefrom. Coincidence gates of a suitable type are found described and shown in the book entitled "Electronics" by Elmore and Sands, pages 120 et sequentes, published by the McGraw-Hill Book Company in 1949. The second required input to And gate 122 is the "on" output of the Schmitt trigger circuit 116. The second required input to And gate 124 is the "off" output of Schmitt trigger circuit 116. The output of And gate 122 will set a "storage-and-direction" flip-flop circuit 126. The output of And gate 124 will serve to reset the "storage-and-direction" flip-flop 126.

When the machine tool table, as driven by its lead screw, moves in one direction the relationships of the motion transducer outputs are such as to cause both Schmitt trigger circuits to provide two "off" outputs to And gate 124 whereupon the flip-flop 126 will be driven to its reset condition indicative of such motions. Flip-flop 126 will stay in its reset condition as long as such motion continues. Upon reversal of the direction of motion of the table, then the relationship between the two transducer signal outputs are such as to operate Schmitt trigger circuit 116 to its "on" condition when Schmitt trigger circuit 114 is in its "off" condition whereupon And gate 122 can apply an output to set the storage-and-direction flip-flop 126, the output from which will thereupon indicate an opposite direction of motion.

The "on" output of the Schmitt trigger 114 is applied through a pulse generating network 120 to the inputs of two And gates 128 and 130. These may be termed "motion-sensing" And gates. A second required input to And gate 128 is the "on" output of the Schmitt trigger circuit 116. A second required input to the And gate 130 is the "off" output of Schmitt trigger circuit 116. The third required input to the And gate 128 is the reset or first stable state output of the flip-flop 126. The third required input to And gate 130 is the set or second stable state output of flip-flop 126.

The output of And gates 128 and 130 are applied to an Or gate 132. An Or gate is a buffer circuit which provides an output upon the occurrence of any of its inputs. The output of Or gate 132 comprises motion pulses which are applied to And gates. The output of the storage-and-direction flip-flop 126 comprises the direction signals which enable the correct one of the pairs of And gates whereby the motion pulses are applied to the correct track on the tape for recording.

The output of Or gate 132 comprises motion pulses for the following reasons. Flip-flop 126 stores the condition of Schmitt trigger circuit 116. This can be concluded from the fact that only a change in output of this Schmitt trigger circuit causes a change in the state of the storage direction flip-flop 126. Upon the occurrence of a first interval during which motion takes place, an output will be derived from And gates 128 or 130 only if the condition of the Schmitt trigger circuit 116 will differ, upon the occurrence of the second interval, from what it was during the first interval. It will be appreciated that such difference is indicative of motion. If no motion has occurred then the condition of Schmitt trigger circuit 116 remains the same and its output is the same as when the storage direction flip-flop 126 was operated. Therefore, no output will be derived from either And gate 128 or And gate 130. If motion has occurred then an output is received from the pulse former 120 which can pass through one of the two And gates 128, 130 which has been enabled by the output of the storage-and-direction flip-flop 126 and the output from the Schmitt trigger circuit 114. The required inputs to And gates 128, 130 insure that within a motion increment only one pulse is emitted for the direction sensed. A pulse signifying an increment of motion can then be recorded at a proper location on a recording medium to represent the fact of the occurrence of a motion as well as its direction.

Referring again to FIGURE 5, and in conjunction therewith FIGURE 7, an explanation of the operation of this system will be given. It will be assumed at the outset that the machine tool table can be jogged or directed in well known manner to bring a transducer, having the proper orientation, to an end of the model from whence it is desired that the tracing operation be commenced. Further, the sensing transducer is lowered until it is at a Z level with respect to the machine tool table at which a contour trace is desired. Thereafter constant voltage is applied from the source 60 to the servo amplifier 66. This results in motion along the X axis at a constant velocity. The sensing transducer amplifier output 54 is applied to the servo amplifier 86 which initially results in the table moving the work piece relative to the sensing transducer in a direction to press the sensing transducer against the work piece in Y. Such motion will continue until the sensing transducer amplifier output is substantially zero.

As the machine tool table moves in the X direction in response to the voltage from the source 60 the sensing transducer furnishes a voltage to the sensing transducer amplifier which causes the machine tool table to move along the Y axis in a direction to always attempt to cause the sensing transducer amplifier output to become zero. The resultant of the X and Y motions is to cause the sensing transducer probe to be moved along the contour of the work piece 140 at the Z level to which it has been set. As a result also of the above motions the X and Y motion transducers provide outputs which are sensed and recorded in the proper tracks of the tape in the tape recorder 84.

The synchro transmitters 68, 88 provide outputs to the differential synchromotor 104 whereby the speed at which the tape transport mechanism is driven is a function of the vector speed of the motion along both axes. The solenoids 106 and 108 are operated to maintain the direction of drive of the differential synchromotor and thereby the tape motion in one direction. When the probe 34 of the sensing transducer reaches one end of the work piece its distance from the table can be set for another tracing operation and the switch 64 can be reversed to cause X motion in the reversed direction.

From the description given it should become apparent how it is possible to employ this system described for successively tracing the contours of a model and making a recording from which machine tool control for duplication can be provided. Various different orientation sensing transducers may be employed, or if desired, a single sensing transducer may be employed having the capability of being oriented as required for sensing the work piece from different directions. To provide true compensation for subsequent cutter offset in the machining cycle the sensing transducer should have exactly the same radius as the intended cutting tool. It should also be apparent that it is not necessary to use the X and Y axes for sensing the contours of a work piece. The X and Z axes or the Y and Z axes may be employed for tracing the contours of a part using the same techniques as have been described.

For those models where the slope of the contour becomes almost parallel to the axis which is being servoed, so that a rapid change in the motion, for example, along the Y axis, occurs, it may become desirable because of servo transient limitations to slow the scan rate of the other axis to prevent large instantaneous displacements from null of the sensing transducer. To effectuate this a switch 142 is provided with connections between the output of the sensing transducer amplifier and the input to the servo amplifier. These connections between the sensing transducer amplifier 54 and servo amplifier 66 are made so that when the switch is operated the sensing transducer amplifier output is in opposition to that of the input to the servo amplifier 66. Thus, when the sensing transducer amplifier output begins to increase the velocity of motion along the X axis begins to decrease. Rectifiers 144 and 146 are provided to prevent any voltage from the source 60 from being applied to the servo amplifier 86.

FIGURE 8 represents a fragment of a tape with recordings thereon representing those obtainable from the employment of this invention. The tape has two channels allotted, one for recording X axis information and the other Y axis information. In the X channel there are two tracks, one for positive motion increment signals and the other for negative motion increment signals. Similarly the Y channel has two tracks respectively allocated for recording signals of motion increments in one or the other direction along the Y axis. The recording pulses along the X axis are continual and occur regularly indicative of the fact that motion along the X axis is constant. The representation of pulses in the plus and minus Y tracks indicate that the speed of motion along the Y axis varies and further there is a reversal in direction along the Y axis indicative of the fact that the contour of the work piece being sensed has reversed in direction. When the tape shown in FIGURE 8 is reproduced through apparatus of the type described in the previously indicated Rosenberg et al. Patent 2,833,941 it controls an automatic machine tool in a manner so that a cutting tool can be guided through a work piece to reproduce the path which the sensing transducer has felt on the contour of the model from which the tape data has been derived.

There has been accordingly shown and described herein a novel, useful and inexpensive arrangement for tracing the contour of a model automatically to the end that motion control signals may be generated and recorded for subsequent utilization in controlling an automatic machine tool to manufacture from a work piece the finished product whose contour was traced.

I claim:

1. In a machine tool of the type having a table upon which a model is positioned and having means for respectively driving said table along a first and a second coordinate axis, each said first and second means including a motor, a lead screw rotatably driven by said motor, and means coupling said lead screw to said table for axial motion of said table responsive to rotary motion of said lead screw, means for modifying said machine tool for providing a recording of motion control signals representative of the contour of said model comprising a sensing transducer of the type including means for producing an output potential which has a maximum value until an object is contacted and then as said sensing transducer continues to move closer to said object said output potential reduces to zero and then increases with a reverse polarity, means for supporting said sensing transducer at a desired position relative to said table and model, means for applying potential to the motor of said first means for driving said table along said first coordinate axis, means for applying the output potential of said sensing transducer to the motor of said second means for driving said table along said second coordinate axis whereby as a result of said motion along both said axes said transducer is moved along the contour of said workpiece, a first motion transducer actuated responsive to motion of said table along said first coordinate axis for producing output signals representative of increments of motion of said table, a second motion transducer actuated responsive to motion of said table along said second coordinate axis for producing output signals representative of increments of motion of said table along said second axis, a movable recording medium having allocated thereon first and second recording channels, means for moving said movable recording medium including a first and second synchro transmitter respectively operatively coupled to the lead screws of said first and second means, a differential synchro receiver, means coupling said first and second synchro transmitters to said differential synchro receiver, and means to move said movable recording medium responsive to said differential synchro receiver output, means for converting the output signals of said first motion transducer to first axis motion control signals, means for converting the output signals of said second motion transducer to second axis motion control signals, means for recording said first axis motion control signals in said first recording channel, and means for recording said second axis motion control signals in said second recording channel.

2. Apparatus for automatically following the contour of a model and for making a recording representative thereof comprising a table upon which a model is positioned, first means for moving said table along a first coordinate axis including a first motor, a first lead screw, means coupling said first lead screw to said first motor to be driven thereby, and means coupling said first lead screw to said table for axial motion along said first coordinate axis responsive to said first lead screw being driven, second means for moving said table along a second coordinate axis including a second motor, a second lead screw, means coupling said second lead screw to said second motor to be driven thereby, and means coupling said second lead screw to said table for axial motion along said second coordinate axis responsive to said second lead screw being driven, a sensing transducer of the type including means for producing an output potential which has a maximum value until an object is contacted and then as said sensing transducer continues to move closer to said object said output potential reduces to zero and then increases with a reverse polarity, means for supporting said transducer at a desired position relative to said table and model, means for applying operating potential to said first motor for moving said table along said first coordinate axis, means for simultaneously applying the output potential of said sensing transducer to said second motor for driving said table along said second coordinate axis whereby as a result of said motion along both said axes said transducer is moved along the contour of said model, a first motion transducer actuated responsive to motion of said table along said first coordinate axis for producing output signals representative of increments of motion of said table, a second motion transducer actuated responsive to motion of said table along said second coordinate axis for producing output signals representative of increments of motion of said table along said second axis, a moveable recording medium having allocated first and second recording channels, means for moving said moveable recording medium at a rate determined by the rate of motion of said table along said first and second axis, a first and second synchro transmitter respectively operatively coupled to the lead screws of said first and second means, a differential synchro receiver, means coupling said first and second synchro transmitters to said differential synchro receiver, and means to move said movable recording medium responsive to said differential synchro receiver output, first means for recording signals in said first recording channel, second means for recording signals in said second recording channel, means for converting the output signals of said first motion transducer to first axis motion control signals, means for converting the output signals of said second motion transducer to second axis motion control signals, means for applying to said first means for recording said first axis motion control signals, and means for applying to said second means for recording said second axis motion control signals.

3. A system as recited in claim 2 wherein in each recording channel of said moveable recording medium there are two tracks respectively allocated for motion control signals recordation in opposite directions, said first and second means for recording each includes a separate means for recording on each of said two tracks, and both said means for applying said respective first and second axis motion control signals to both said means for recording each includes a means responsive to the respective first and second motion transducer outputs to detect the direction of motion of said table, and means responsive to said detected motion direction to apply said axis motion control signals to the one of the means for recording assigned for recording signals in the track assigned to the detected direction.

4. A system as recited in claim 2 wherein there is included means for applying output potential from said sensing transducer to said first means for moving said model for slowing motion along said first coordinate axis for relatively rapid model contour changes.

References Cited in the file of this patent

UNITED STATES PATENTS

| | | |
|---|---|---|
| 2,755,160 | Holmes | July 17, 1956 |
| 2,837,707 | Stokes | June 3, 1958 |
| 2,851,643 | Limberger | Sept. 9, 1958 |
| 2,866,153 | Rhoades | Dec. 23, 1958 |
| 2,866,506 | Hierath et al. | Dec. 30, 1958 |
| 2,882,476 | Wetzel | Apr. 14, 1959 |
| 2,939,287 | Capron et al. | June 7, 1960 |

FOREIGN PATENTS

| | | |
|---|---|---|
| 316,491 | Switzerland | Nov. 30, 1956 |